(12) United States Patent
Yeo et al.

(10) Patent No.: US 8,196,200 B1
(45) Date of Patent: Jun. 5, 2012

(54) PIGGYBACKING MALICIOUS CODE BLOCKER

(75) Inventors: Matthew Yeo, Los Angeles, CA (US); Carey Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 1651 days.

(21) Appl. No.: 11/540,821

(22) Filed: Sep. 28, 2006

(51) Int. Cl.
*G08B 23/00* (2006.01)
*G06F 7/04* (2006.01)

(52) U.S. Cl. ........... 726/22; 726/1; 726/2; 726/3; 726/4; 726/23; 726/24; 726/26; 726/27; 726/29; 726/30; 713/161; 713/165; 713/170; 713/187; 713/188

(58) Field of Classification Search .............. 726/22–24, 726/26
See application file for complete search history.

(56) References Cited

U.S. PATENT DOCUMENTS

| | | | |
|---|---|---|---|
| 6,968,509 B1 * | 11/2005 | Chang et al. ................. | 715/802 |
| 7,194,004 B1 * | 3/2007 | Thomsen ...................... | 370/401 |
| 7,698,442 B1 * | 4/2010 | Krishnamurthy et al. .... | 709/229 |
| 2003/0112942 A1 * | 6/2003 | Brown et al. ................. | 379/196 |
| 2003/0191608 A1 * | 10/2003 | Anderson et al. ............ | 702/189 |
| 2005/0027820 A1 * | 2/2005 | O'Laughlen et al. ........ | 709/217 |
| 2006/0206571 A1 * | 9/2006 | Kuwahara ..................... | 709/206 |
| 2006/0206937 A1 * | 9/2006 | Repasi et al. ................ | 726/22 |
| 2007/0055766 A1 * | 3/2007 | Petropoulakis et al. ...... | 709/224 |
| 2007/0074169 A1 * | 3/2007 | Chess et al. .................. | 717/126 |
| 2007/0095897 A1 * | 5/2007 | Carpenter et al. ............ | 235/379 |
| 2007/0168285 A1 * | 7/2007 | Girtakovskis et al. ......... | 705/50 |
| 2007/0174908 A1 * | 7/2007 | Eshun et al. .................. | 726/12 |
| 2007/0234061 A1 * | 10/2007 | Teo ............................... | 713/178 |
| 2007/0239606 A1 * | 10/2007 | Eisen ............................. | 705/51 |
| 2008/0010683 A1 * | 1/2008 | Baddour et al. ............... | 726/24 |
| 2008/0082662 A1 * | 4/2008 | Dandliker et al. ............ | 709/225 |
| 2008/0141342 A1 * | 6/2008 | Curnyn ......................... | 726/3 |
| 2009/0037976 A1 * | 2/2009 | Teo et al. ....................... | 726/1 |
| 2009/0089869 A1 * | 4/2009 | Varghese ....................... | 726/7 |
| 2009/0144826 A2 * | 6/2009 | Piccard .......................... | 726/24 |
| 2009/0204524 A1 * | 8/2009 | McGeorge ..................... | 705/35 |
| 2009/0204669 A1 * | 8/2009 | Allan ............................. | 709/203 |
| 2011/0238574 A1 * | 9/2011 | Miller et al. ................... | 705/43 |
| 2011/0289553 A1 * | 11/2011 | Carter et al. ................... | 726/1 |

OTHER PUBLICATIONS

Pullar-Strecker, "NZ bank adds security online", *The Sydney Morning Herald*, Nov. 8, 2004, pp. 1-2 [online]. Retrieved from the Internet on Jul. 31, 2006 from <URL:http://www.smh.com.au/news/Breaking/NZ-bank-adds-security-online/2004/11/08/1099781306318.html>.

(Continued)

*Primary Examiner* — Edan Orgad
*Assistant Examiner* — Jenise Jackson
(74) *Attorney, Agent, or Firm* — McKay and Hodgson, LLP; Serge J. Hodgson; Sean P. Lewis

(57) ABSTRACT

A method includes determining whether a transaction request has occurred during a transaction session. Upon a determination that a transaction request has occurred, the method includes parsing critical values from the transaction request and determining whether the critical values are legitimate. If the critical values are found to be suspicious instead of legitimate, the method further includes seeking approval of the transaction request from the user of the host computer system. Upon approval of the transaction request, the transaction request is allowed. Conversely, upon denial of the transaction request, the transaction request is determined to be malicious, and protective action is taken including terminating the transaction request.

18 Claims, 5 Drawing Sheets

OTHER PUBLICATIONS

"Transaction Authorisation Code (TAC)", Maybank, 2001-2006, pp. 1-4 [online]. Retrieved from the Internet on Jul. 31, 2006 from <URL:http://www.maybank2u.com.my/consumer/online_banking/about_tac.shtml>. No author provided.

"What's Hot: netCODE—Making sure it's really you", ASB Bank Limited, 2004, pp. 1-2 [online]. Retrieved from the Internet on Jul. 31, 2006 from <URL:http://www.bankdirect.co.nz/story796.asp>. No author provided.

* cited by examiner

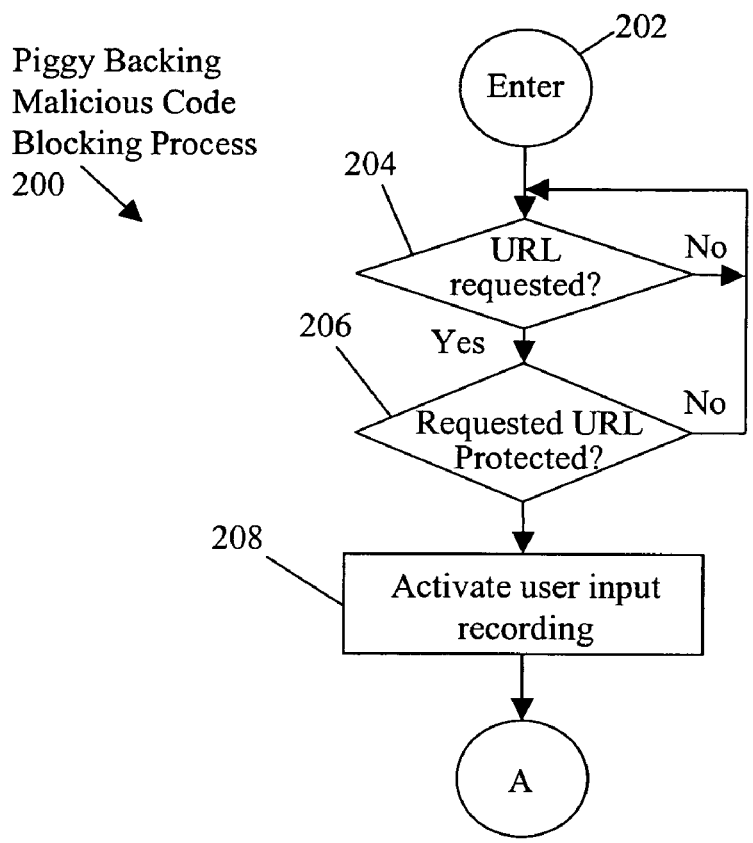
FIG. 2A
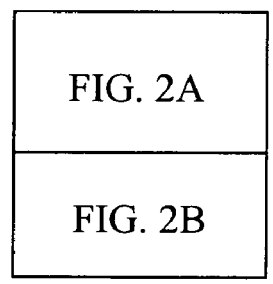
Key to FIG. 2

PIGGYBACKING MALICIOUS CODE BLOCKER

BACKGROUND

1. Field of the Invention

The present invention relates to computer system security. More particularly, the present invention relates to a system and method of detecting and blocking malicious code on a computer system.

2. Description of the Related Art

Attackers attempt to steal passwords, for example, to gain access to the bank accounts of a bank customer. To prevent this sort of theft, instead of assigning a bank customer a single static password that can be reused by an attacker if stolen, the password is continuously changed or is only valid for a single login. In this manner, even if the password is stolen, the password will not be valid when the attacker attempts to use it.

However, even if a password is only valid for a single logon, an attacker can still gain access to the bank accounts of the bank customer using an active attack, sometimes called a piggybacking attack. More particularly, the attacker installs piggybacking malicious code on a bank customer's (the victim's) computer system. The attacker waits until the bank customer logs into the bank, and piggybacks malicious transactions in the context of the bank customer's otherwise legitimate banking session. Accordingly, to facilitate secure transactions, any piggybacking attack should be detected and defeated.

SUMMARY OF THE INVENTION

In accordance with one embodiment, a method includes determining whether a transaction request has occurred during a transaction session. Upon a determination that a transaction request has occurred, the method includes parsing critical values from the transaction request and determining whether the critical values are legitimate. If the critical values are found to be suspicious instead of legitimate, the method further includes seeking approval of the transaction request from the user of the host computer system. Upon approval of the transaction request, the transaction request is allowed. Conversely, upon denial of the transaction request, the transaction request is determined to be malicious, and protective action is taken including terminating the transaction request.

In the above manner, malicious transactions within an otherwise legitimate transaction session are detected and defeated. Further, legitimate transactions are evaluated and allowed without user input, and the associated user inconvenience and annoyance. More particularly, all malicious transactions are blocked, while the user is rarely interrupted to authenticate a legitimate transaction.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2B:
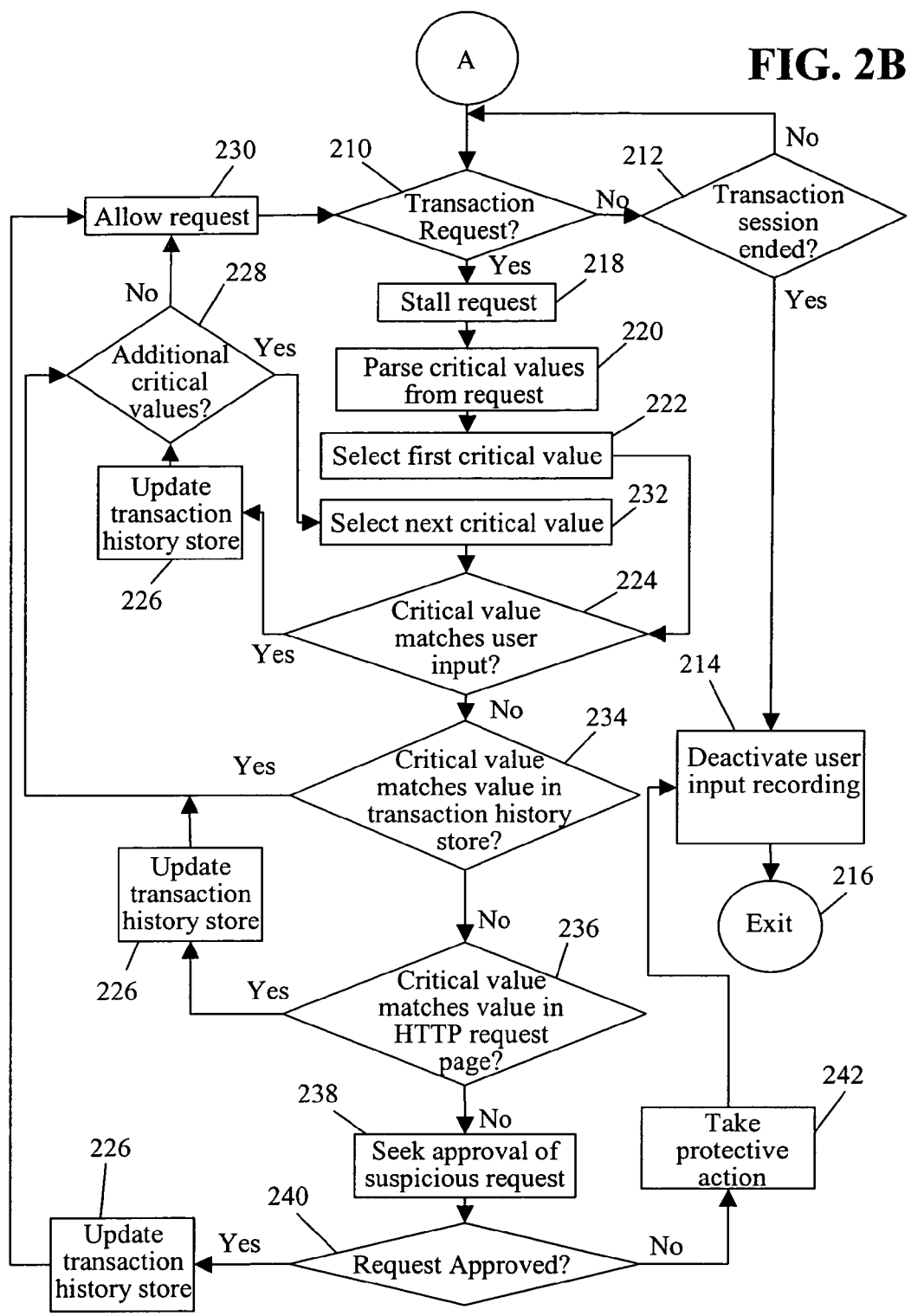
FIG. 2 is a key to FIGS. 2A, 2B, which are a flow diagram of a piggybacking malicious code blocking process in accordance with one embodiment of the present invention.

In accordance with one embodiment, referring to FIG. 2B, a method includes determining whether a transaction request has occurred during a transaction session in a TRANSACTION REQUEST CHECK OPERATION 210. Upon a determination that a transaction request has occurred, the method includes parsing critical values from the transaction request in a PARSE CRITICAL VALUES FROM REQUEST OPERATION 220 and determining whether the critical values are legitimate.

More particularly, the critical values are matched against user input (e.g., keyboard input) in a CRITICAL VALUE MATCHES USER INPUT CHECK OPERATION 224 to determine if the critical values were input by the user and thus legitimate. The critical values are matched against values in a transaction history store in a CRITICAL VALUE MATCHES VALUE IN TRANSACTION HISTORY STORE CHECK OPERATION 234 to determine if the critical values are form values cached by the Web browser and thus legitimate. The critical values are matched against cached and/or dynamic values in the HTTP request page in a CRITICAL VALUE MATCHES VALUE IN HTTP REQUEST PAGE CHECK OPERATION 236 to determine if the critical values are cached and/or dynamic values from the HTTP request page and thus legitimate.

Upon a determination that the critical values do not match the user input, the form values cached by the Web browser, or the cached and/or dynamic values from the HTTP request page, the method further includes seeking approval of the transaction request from the user of the host computer system in a SEEK APPROVAL OF SUSPICIOUS REQUEST OPERATION 238.

Upon approval of the transaction request (a YES in REQUEST APPROVED CHECK OPERATION 240), the transaction request is allowed in an ALLOW REQUEST OPERATION 230. Conversely, upon denial of the transaction request (a NO in REQUEST APPROVED CHECK OPERATION 240), the transaction request is determined to be malicious, and protective action is taken including terminating the transaction request in a TAKE PROTECTIVE ACTION OPERATION 242.

In the above manner, malicious transactions within an otherwise legitimate transaction session are detected and defeated. Further, legitimate transactions are evaluated and allowed without user input, and the associated user inconvenience and annoyance. More particularly, all malicious transactions are blocked, while the user is rarely interrupted to authenticate a legitimate transaction.

Figure 1:
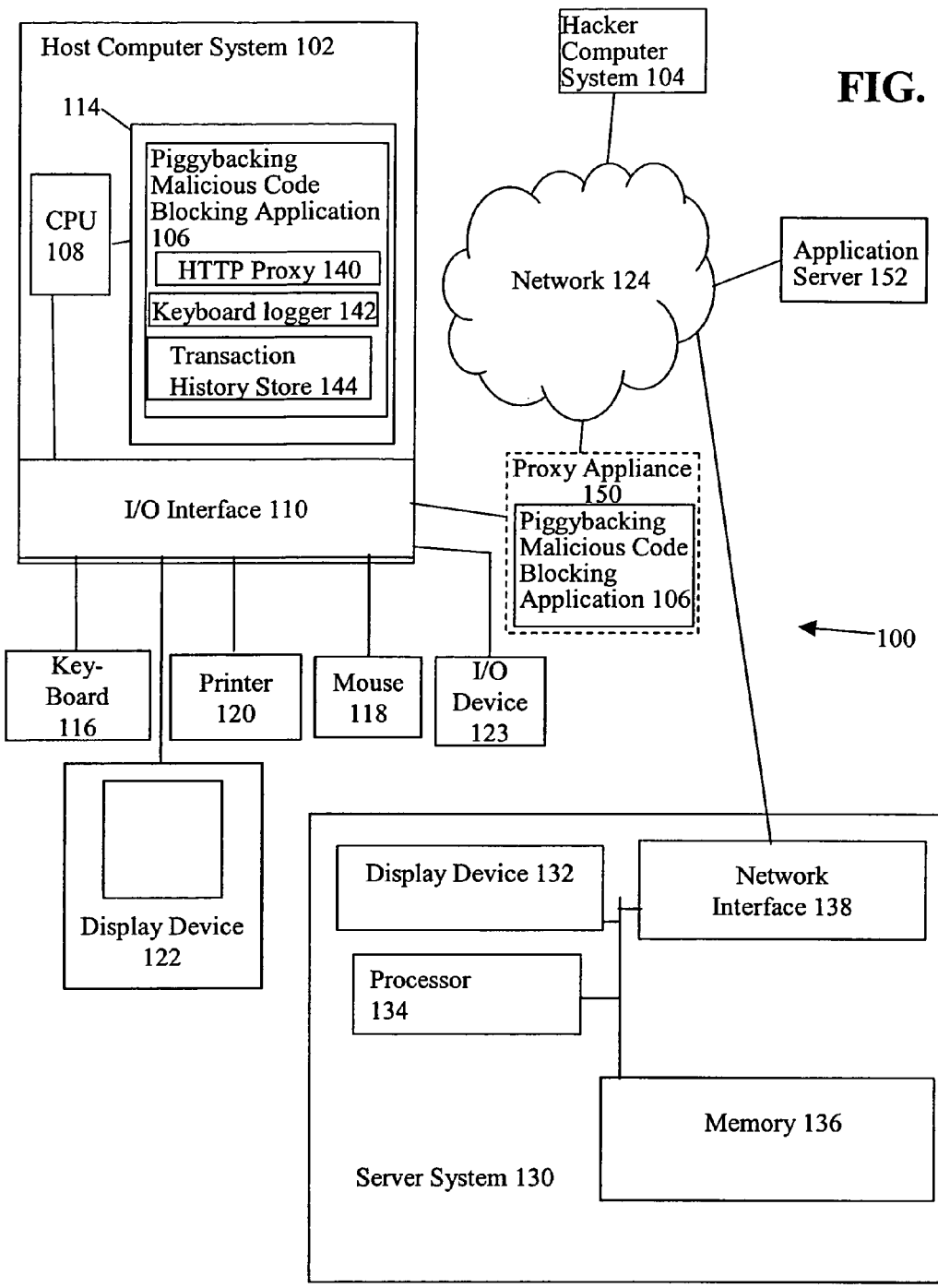
FIG. 1 is a diagram of a client-server system that includes a piggybacking malicious code blocking application executing on a host computer system in accordance with one embodiment of the present invention.

More particularly, FIG. 1 is a diagram of a client-server system 100 that includes a piggybacking malicious code blocking application 106 executing on a host computer system 102 in accordance with one embodiment of the present invention. Piggybacking malicious code blocking application 106 includes a HTTP proxy 140, a keyboard logger 142, and a transaction history store 144.

Host computer system 102, sometimes called a client or user device, typically includes a central processing unit (CPU) 108, sometimes called a processor 108, an input/output (I/O) interface 110, and a memory 114. Host computer system 102 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from host computer system 102.

In one embodiment, piggybacking malicious code blocking application 106 is loaded into host computer system 102 via I/O device 123, such as from a CD, DVD, or floppy disk containing piggybacking malicious code blocking application 106.

Host computer system 102 is coupled to a server system 130 of computer system 100 by a network 124. Server system 130 typically includes a display device 132, a processor 134, a memory 136, and a network interface 138. Additional computer systems such as a hacker, e.g., a second, computer system 104, an optional proxy appliance 150, and an application server 152 are also associated with network 124.

Network 124 can be any network or network system that is of interest to a user. In various embodiments, network interface 138 and I/O interface 110 include analog modems, digital modems, or a network interface card.

Piggybacking malicious code blocking application 106 is stored, for example, in memory 114 of host computer system 102 and executed on host computer system 102.

The particular type of and configuration of host computer system 102, server system 130, hacker computer system 104, proxy appliance 150, and application server 152 are not essential to this embodiment of the present invention.

Herein, in one embodiment, malicious code is defined as any computer program, module, set of modules, or code that enters a computer system environment without an authorized user's knowledge and/or without an authorized user's consent. Trojan horse software, sometimes called piggybacking malicious code, is one example of a malicious code. For example, the malicious code is propagated from hacker computer system 104 (the attacker's computer system) to host computer system 102 (the victim's computer system).

FIG. 2 is a key to FIGS. 2A, 2B, which are a flow diagram of a piggybacking malicious code blocking process 200 in accordance with one embodiment of the present invention. Referring now to FIGS. 1, 2A, 2B together, in one embodiment, execution of piggybacking malicious code blocking application 106 by processor 108 results in the operations of piggybacking malicious code blocking process 200 as described below.

From an ENTER OPERATION 202, flow moves to a URL REQUESTED CHECK OPERATION 204. In URL REQUESTED CHECK OPERATION 204, a determination is made as to whether a Uniform Resource Locator (URL) has been requested. For example, HyperText Transfer Protocol (HTTP) proxy 140 intercepts the URL requested. HTTP proxies are well-known to those of skill in the art. Generally, HTTP proxy 140 sits between user applications of host computer system 102, e.g., a Web browser of host computer system 102, and network 124. HTTP traffic of user applications of host computer system 102 pass through HTTP proxy 140.

If a URL has not been requested, flow remains at URL REQUESTED CHECK OPERATION 204. Conversely, if a URL has been requested, flow moves from URL REQUESTED CHECK OPERATION 204 to a REQUESTED URL PROTECTED CHECK OPERATION 206. In REQUESTED URL PROTECTED CHECK OPERATION 206, a determination is made as to whether the requested URL is protected.

In one embodiment, HTTP proxy 140 contains a list of protected URLs. The URL request is intercepted by HTTP proxy 140, which compares the requested URL to the list of protected URLs. If the requested URL matches a URL in the list of protected URLs, a determination is made that the requested URL is protected. Conversely, if the requested URL does not match any of the URLs in the list of protected URLs, a determination is made that the requested URL is not protected.

In one embodiment, a URL is a protected URL if the URL is for a protected financial institution's web page. In one specific embodiment, the list of protected URLs is configurable, e.g., by the user or system administrator of host computer system 102. In another embodiment, the list of protected URLs is periodically updated from a security center, e.g., for example, using SYMANTEC'S LIVE UPDATE® feature.

If a determination is made that the requested URL is not protected, flow returns from REQUESTED URL PROTECTED CHECK OPERATION 206 to URL REQUESTED CHECK OPERATION 204, and awaits the next URL request. Conversely, if a determination is made that the requested URL is protected, flow moves from REQUESTED URL PROTECTED CHECK OPERATION 206 to an ACTIVATE USER INPUT RECORDING OPERATION 208.

In one embodiment, a determination that a protected URL has been requested indicates that a financial transaction session is being initiated. For example, the protected URL request is followed by a download of a financial institution's user authentication web page, e.g., from application server 152. The user, sometimes called the financial institution's customer, of host computer system 102 uses the financial institution's user authentication web page to logon, e.g., with a user name and password, to the financial institution's online services. Upon successful logon, the financial transaction session is initiated. During the financial transaction session, the user can perform several legitimate financial transactions.

However, if host computer system 102 has been compromised by piggybacking malicious code, a piggybacking malicious transaction can also be attempted during the otherwise legitimate financial transaction session. However, as set forth below, this piggybacking malicious transaction is detected and defeated in accordance with one embodiment.

Accordingly, upon a determination that a protected URL has been requested indicating that a financial transaction session is being initiated, flow moves to ACTIVATE USER INPUT RECORDING OPERATION 208. In ACTIVATE USER INPUT RECORDING OPERATION 208, user input recording is activated, e.g., keyboard input recording and/or other user input device recording is activated. More particularly, any keyboard input is recorded by keyboard logger 142. Illustratively, the user of host computer system 102 inputs information into host computer system 102 using keyboard 116, and this information is recorded by keyboard logger 142 as keyboard input, i.e., user input. For example, the user inputs information into a downloaded protected financial institution's web page, sometimes called a HTTP request page, such as that illustrated in FIG. 3.

In another embodiment, recording of other user input devices, e.g., mouse 118, a microphone, that the user uses to input information into host computer system 102 is activated in ACTIVATE USER INPUT RECORDING OPERATION 208.

From ACTIVATE USER INPUT RECORDING OPERATION 208, flow moves to a TRANSACTION REQUEST CHECK OPERATION 210. In TRANSACTION REQUEST CHECK OPERATION 210, a determination is made as to whether a transaction request has been made. A transaction request is a request for a transaction, e.g., a financial transaction using a financial institution's HTTP request page. As discussed above, a transaction session can include a plurality of individual transactions. One example of a transaction request is a request to transfer money from one account to another account although the request is for any one of a number of other transactions in other embodiments.

If a determination is made that there has not been a transaction request, flow moves from TRANSACTION REQUEST CHECK OPERATION 210 to a TRANSACTION SESSION ENDED CHECK OPERATION 212. Conversely, if a determination is made that there has been a transaction request, flow moves from TRANSACTION REQUEST CHECK OPERATION 210 to a STALL REQUEST OPERATION 218.

Returning again to TRANSACTION SESSION ENDED CHECK OPERATION 212, in TRANSACTION SESSION ENDED CHECK OPERATION 212, a determination is made as to whether the transaction session has ended. If a determination is made that the transaction session has not ended, flow returns to TRANSACTION REQUEST CHECK OPERATION 210, which is performed as discussed above. Accordingly, flow remains at CHECK OPERATIONS 210, 212, until it either a transaction request is made or the transaction session has ended.

If a determination is made that the transaction session has ended, e.g., the user has left or logged off the protected financial institution's web page or closed the Web browser, flow moves from TRANSACTION SESSION ENDED CHECK OPERATION 212 to a DEACTIVATE USER INPUT RECORDING OPERATION 214. In DEACTIVATE USER INPUT RECORDING OPERATION 214, user input recording is deactivated, e.g., keyboard input recording and/or other user input device recording is deactivated. In one embodiment, keyboard input recording by keyboard logger 142 is deactivated. More particularly, as the user has ended the transaction session, the risk of a piggybacked malicious transaction within the context of the legitimate transaction session is eliminated. Accordingly, user input recording is unnecessary and thus deactivated in DEACTIVATE USER INPUT RECORDING OPERATION 214.

From DEACTIVATE USER INPUT RECORDING OPERATION 214, flow moves to and exits at an EXIT OPERATION 216 or returns to URL REQUESTED CHECK OPERATION 204 and awaits the next URL request.

However, returning to TRANSACTION REQUEST CHECK OPERATION 210, if a transaction request is made, flow moves to STALL REQUEST OPERATION 218. In STALL REQUEST OPERATION 218, the transaction request is stalled, i.e., is prevented from leaving host computer system 102, e.g., at least temporarily. Illustratively, the transaction request is intercepted by HTTP proxy 140, which stalls (holds) the transaction request until a determination is made that the transaction is legitimate as set forth below.

From STALL REQUEST OPERATION 218, flow moves to a PARSE CRITICAL VALUES FROM REQUEST OPERATION 220. In PARSE CRITICAL VALUES FROM REQUEST OPERATION 220, critical values are parsed from the transaction request. In one embodiment, critical values, sometimes called parameters, are values that are critical to a successful piggybacking malicious code attack. For example, the transferee account number and the amount transferred are critical values and the other values of the transaction request are non-critical. In another embodiment, all values of the transaction request are critical values. Illustratively, which values of the transaction request are critical values is configurable, e.g., by the user or system administrator of host computer system 102, by the financial institution, or by the security vendor.

HTTP proxy 140 contains application-specific knowledge of the form of the transaction request. Illustratively, a financial institution, e.g., a bank or stock brokerage firm, that desires the protection of piggybacking malicious code blocking application 106 provides the application-specific knowledge of the format of the financial institution's HTTP request page, the financial institution's transaction request, as well as which values in the financial institution's transaction request the financial institution considers as critical values. This information is contained in piggybacking malicious code blocking application 106 to enable HTTP proxy 140 to parse cached and/or dynamic values from the HTTP request page and to parse critical values from the transaction request.

In one embodiment, the HTTP request page is downloaded from application server 152 to host computer system 102. Values, e.g., critical and non-critical values, are entered into the HTTP request page. A transaction request is generated, the values from the HTTP request page being transmitted as part of the transaction request. An illustrative example of a HTTP request page and a transaction request is set forth below in reference to FIG. 3.

From PARSE CRITICAL VALUES FROM REQUEST OPERATION 220, flow moves to a SELECT FIRST CRITICAL VALUE OPERATION 222. In SELECT FIRST CRITICAL VALUE OPERATION 222, a first critical value is selected. Illustratively, a plurality of critical values are parsed from the transaction request in PARSE CRITICAL VALUES FROM REQUEST OPERATION 220, and a first one of these critical values is selected in SELECT FIRST CRITICAL VALUE OPERATION 222.

From SELECT FIRST CRITICAL VALUE OPERATION 222, flow moves to a CRITICAL VALUE MATCHES USER INPUT CHECK OPERATION 224. In CRITICAL VALUE MATCHES USER INPUT CHECK OPERATION 224, a determination is made as to whether the selected critical value matches the user input.

As set forth above, the critical value is parsed from the transaction request in PARSE CRITICAL VALUES FROM REQUEST OPERATION 220. As also set forth above, user input recording, e.g., keyboard input recording, was activated in ACTIVATE USER INPUT RECORDING OPERATION 208 and thus any user input has been recorded. The critical value is compared to the recorded user input to determine whether the critical value corresponds to information input by the user, e.g., using the keyboard, sometimes called keyboard input.

A determination in CRITICAL VALUE MATCHES USER INPUT CHECK OPERATION 224 that the critical value matches the user input means that the user of host computer system 102 input the critical value in the transaction request, e.g., using keyboard 116, i.e., the critical value is legitimate. Stated another way, a determination in CRITICAL VALUE MATCHES USER INPUT CHECK OPERATION 224 that the critical value matches the user input means that the critical value in the transaction request was not programmatically entered, e.g., by piggybacking malicious code, without use of a user input device of host computer system 102 such as keyboard 116.

Accordingly, upon a determination that the critical value matches the user input, flow moves from CRITICAL VALUE MATCHES USER INPUT CHECK OPERATION 224 to an UPDATE TRANSACTION HISTORY STORE OPERATION 226. In UPDATE TRANSACTION HISTORY STORE OPERATION 226, the transaction history store of the host computer system is updated with the critical value of the transaction request, and any other desired information associated with transaction request. In accordance with this embodiment, transaction history store 144 of host computer system 102 is updated by adding the critical value from the transaction request to transaction history store 144, if the critical value is not already in transaction history store 144.

Transaction history store 144 is a collection of critical values from previous transaction requests. Illustratively, the transferee account numbers and amounts of past transaction requests are stored in transaction history store 144 although any one of a number of critical values can be store depending upon the format of the transaction request and which values are considered as critical values.

From UPDATE TRANSACTION HISTORY STORE OPERATION 226, flow moves to an ADDITIONAL CRITICAL VALUES CHECK OPERATION 228. In ADDITIONAL CRITICAL VALUES CHECK OPERATION 228, a determination is made as to whether there are additional critical values in the transaction request that have not been established as legitimate values. If a determination is made that there are no additional critical values, flow moves from ADDITIONAL CRITICAL VALUES CHECK OPERATION 228 to an ALLOW REQUEST OPERATION 230. Conversely, if a determination is made that there is at least one additional critical value, flow moves from ADDITIONAL CRITICAL VALUES CHECK OPERATION 228 to a SELECT NEXT CRITICAL VALUE OPERATION 232.

To illustrate, assume the transaction request contains only a single critical value that matches the keyboard input (user input) in CRITICAL VALUE MATCHES USER INPUT CHECK OPERATION 224. In this event, flow moves to ALLOW REQUEST OPERATION 230. In ALLOW REQUEST OPERATION 230, the transaction request is allowed. In one embodiment, the transaction request is released from HTTP proxy 140, and the transaction request is transmitted to application server 152. Recall that the transaction request was stalled in STALL REQUEST OPERATION 218.

From ALLOW REQUEST OPERATION 230, flow returns to TRANSACTION REQUEST CHECK OPERATION 210, which is performed as discussed above.

However, if a determination is made that there is at least one additional critical value, flow moves from ADDITIONAL CRITICAL VALUES CHECK OPERATION 228 to SELECT NEXT CRITICAL VALUE OPERATION 232. In SELECT NEXT CRITICAL VALUE OPERATION 232, the next critical value from the transaction request is selected. From SELECT NEXT CRITICAL VALUE OPERATION 232, flow moves to CRITICAL VALUE MATCHES USER INPUT CHECK OPERATION 224, which is performed as discussed above but now on the critical value selected in SELECT NEXT CRITICAL VALUE OPERATION 232.

Return again to CRITICAL VALUE MATCHES USER INPUT CHECK OPERATION 224, upon a determination that the critical value being evaluated does not match the user input, e.g., keyboard input, flow moves to a CRITICAL VALUE MATCHES VALUE IN TRANSACTION HISTORY STORE CHECK OPERATION 234. In CRITICAL VALUE MATCHES VALUE IN TRANSACTION HISTORY STORE CHECK OPERATION 234, a determination is made as to whether the critical value matches a value in the transaction history store, i.e., transaction history store 144 in this embodiment.

As set forth above, the critical value is parsed from the transaction request in PARSE CRITICAL VALUES FROM REQUEST OPERATION 220. As also set forth above, transaction history store 144 is a collection of critical values from previous transaction requests. The parsed critical value is compared to the stored critical values in transaction history store 144 to determine whether the critical value correspond to a critical value from a previous transaction request.

As discussed above, the critical value being evaluated was not input directly into the transaction request using keyboard 116. However, critical values can legitimately be entered into a transaction request by means other than keyboard 116.

For example, form values are cached by the Web browser and programmatically entered into the transaction request. For example, in a previous transaction request, the user entered the form value as a critical value into the previous transaction request using keyboard 116. In this previous transaction request, a determination was made that the critical value matched the user input in CRITICAL VALUE MATCHES USER INPUT CHECK OPERATION 224, and transaction history store 144 was updated with the critical value. As one specific example, the user pays recurring bills every month by transferring funds from a bank account, and the recipient of each transaction appears in the transaction history store, the recipients having been added during the previous transaction requests.

Accordingly, if the critical value being evaluated matches a value in transaction history store 144, then the critical value is the same as a critical value previously entered by the user or parsed from the HTTP request page as discussed further below in regards to a CRITICAL VALUE MATCHES VALUE IN HTTP REQUEST PAGE CHECK OPERATION 236. In either event, the critical value corresponds to a critical value previously entered by the user or retrieved from application server 152, i.e., is a legitimate critical value. Thus, upon a determination that the critical value matches a value in the transaction history store, flow moves from CRITICAL VALUE MATCHES VALUE IN TRANSACTION HISTORY STORE CHECK OPERATION 234 to ADDITIONAL CRITICAL VALUES CHECK OPERATION 228, which is performed as discussed above.

Conversely, upon a determination that the critical value being evaluated does not match any of the values in the transaction history store, flow moves from CRITICAL VALUE MATCHES VALUE IN TRANSACTION HISTORY STORE CHECK OPERATION 234 to CRITICAL VALUE MATCHES VALUE IN HTTP REQUEST PAGE CHECK OPERATION 236. In CRITICAL VALUE MATCHES VALUE IN HTTP REQUEST PAGE CHECK OPERATION 236, a determination is made as to whether the critical value being evaluated matches a value in the HTTP request page.

In this event, the critical value being evaluated was not input by the user directly into the transaction request nor was the critical value programmatically entered as a form value by the Web browser. However, critical values can legitimately be entered into a transaction request as cached and/or dynamic values in the HTTP request page from application server 152. For example, a list of past payees is listed in a pulldown menu in the HTTP request page as cached values downloaded from application server 152 at the same time as the HTTP request page or as dynamic values downloaded from application server 152 dynamically after the initial download of the HTTP request page, e.g., through the use of AJAX (Asynchronous JavaScript and XML). The user selects one of the past payees, e.g., using mouse 118, and the selected past payees becomes a critical value in the transaction request.

As set forth above, the critical value was parsed from the transaction request in PARSE CRITICAL VALUES FROM REQUEST OPERATION 220. As also set forth above, HTTP proxy 140 has knowledge of the format of the HTML of the HTTP request page and parses cached and/or dynamic values from the HTTP request page. The parsed critical value of the transaction request is compared to cached and/or dynamic values from the HTTP request page to determine whether the critical value correspond to a cached and/or dynamic value from the HTTP request page.

A determination in CRITICAL VALUE MATCHES VALUE IN HTTP REQUEST PAGE CHECK OPERATION 236 that the critical value matches a cached and/or dynamic value in the HTTP request page means that the HTTP request page contained the critical value, i.e., the critical value is legitimate. In this manner, the critical value is authenticated without requiring user authentication, e.g., in instances where the user has been using the financial institution's online services for some time but piggybacking malicious code blocking application 106 has just been installed.

Accordingly, upon a determination that the critical value matches a cached and/or dynamic value in the HTTP request page, flow moves from CRITICAL VALUE MATCHES VALUE IN HTTP REQUEST PAGE CHECK OPERATION 236 to UPDATE TRANSACTION HISTORY STORE OPERATION 226, which is performed as discussed above. More particularly, transaction history store 144 is updated with the critical value from the transaction request.

Conversely, upon a determination that the critical value does not match a cached and/or dynamic value in the HTTP request page, flow moves from CRITICAL VALUE MATCHES VALUE IN HTTP REQUEST PAGE CHECK OPERATION 236 to a SEEK APPROVAL OF SUSPICIOUS REQUEST OPERATION 238. In SEEK APPROVAL OF SUSPICIOUS REQUEST OPERATION 238, approval, e.g., from the user of host computer system 102, of the transaction request is sought.

In this event, at least one critical value of the transaction request was not input by the user directly into the transaction request, nor was the critical value programmatically entered as a form value by the Web browser, nor was the critical value programmatically entered as a cached and/or dynamic value from the HTTP request page. Accordingly, the transaction request is suspicious. More particularly, the transaction request is likely to be a piggybacking malicious transaction request in the context of an otherwise legitimate transaction session.

Accordingly, in SEEK APPROVAL OF SUSPICIOUS REQUEST OPERATION 238, the user of host computer system 102 is asked to explicitly authenticate (approve) the transaction request. Any one of a number of authentication techniques can be used. In one embodiment, a simple yes/no dialog box is displayed to the user, and the user selects the "yes" button to approve the transaction request and "no" button to deny the transaction request.

In another embodiment, a picture containing text is displayed to the user, and the user is asked to enter the displayed text. If the text is entered correctly, the transaction request is approved. Conversely, if the text is not entered or entered incorrectly, the transaction request is denied. Generally, the approval of the transaction request is sought using an authentication technique that prevents malicious code from maliciously approving the transaction request in the event the transaction request is actually malicious.

From SEEK APPROVAL OF SUSPICIOUS REQUEST OPERATION 238, flow moves to a REQUEST APPROVED CHECK OPERATION 240. In REQUEST APPROVED CHECK OPERATION 240, a determination is made as to whether the suspicious transaction request has been approved by the user of host computer system 102.

If the transaction request has been approved by the user, the suspicious transaction request is legitimate, and flow moves from REQUEST APPROVED CHECK OPERATION 240 to UPDATE TRANSACTION HISTORY STORE OPERATION 226 and ALLOW REQUEST OPERATION 230, which are performed as discussed above. Conversely, if the transaction request is not approved by the user, the suspicious transaction request is malicious, and flow moves from REQUEST APPROVED CHECK OPERATION 240 to a TAKE PROTECTIVE ACTION OPERATION 242.

In TAKE PROTECTIVE ACTION OPERATION 242, protective action is taken to defeat the malicious transaction request. Illustratively, the transaction request is terminated, e.g., by HTTP proxy 140. Recall the transaction request was stalled in STALL REQUEST OPERATION 218.

In another embodiment, the user of host computer system 102 and/or a system administrator are alerted, e.g., with a pop-up window, by writing to a log file, by sending an e-mail, or otherwise, that malicious code has been detected on host computer system 102. Any one of a number of protective actions can be taken, and the above examples are illustrative only, and not limiting.

From TAKE PROTECTIVE ACTION OPERATION 242, flow moves to DEACTIVATE USER INPUT RECORDING OPERATION 214, which is performed as discussed above.

Although CRITICAL VALUE MATCHES USER INPUT CHECK OPERATION 224 is set forth as preceding CRITICAL VALUE MATCHES VALUE IN TRANSACTION HISTORY STORE CHECK OPERATION 234, which, in turn, is set forth as preceding CRITICAL VALUE MATCHES VALUE IN HTTP REQUEST PAGE CHECK OPERATION 236, in other embodiments, CHECK OPERATIONS 224, 234, 236 are performed in a different order or simultaneously. Generally, CHECK OPERATIONS 224, 234, 236 are performed in any order or simultaneously to determine whether the critical value being evaluated is legitimate.

Figure 3:
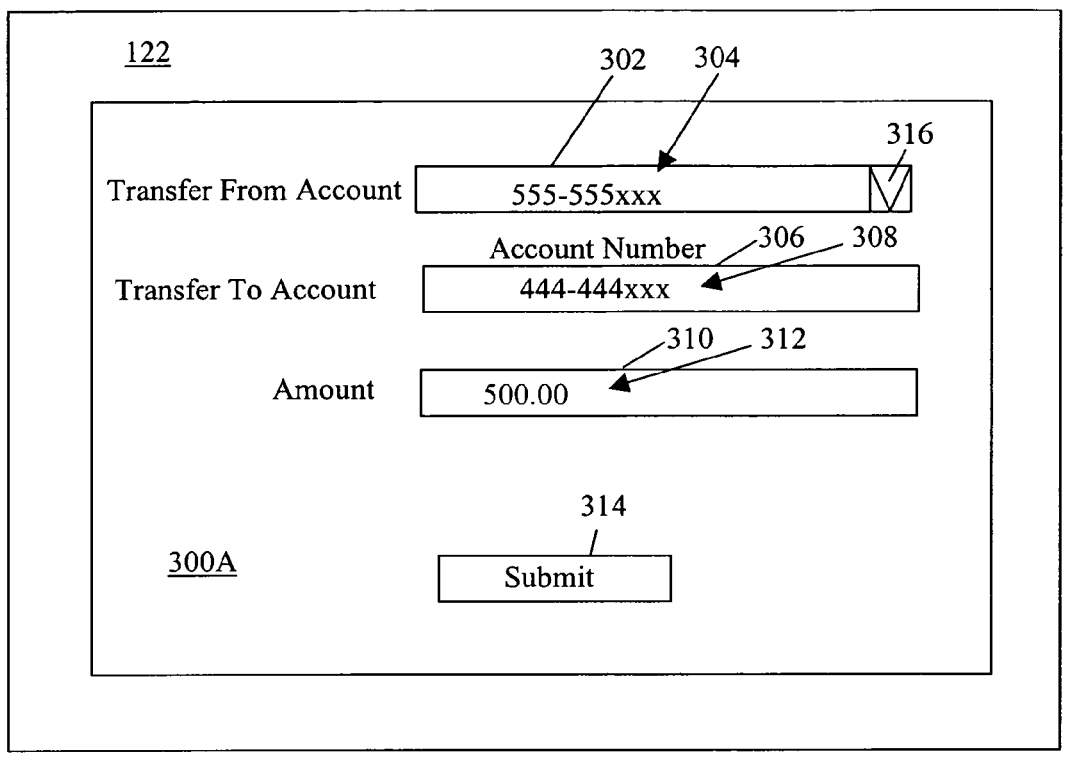
FIGS. 3 and 4 are protected financial institution's HTTP request pages as displayed on a display device of the host computer system of FIG. 1 in accordance with embodiments of the present invention.

FIG. 3 is a protected financial institution's HTTP request page 300A as displayed on display device 122 of host computer system 102 of FIG. 1 in accordance with one embodiment of the present invention. Referring now to FIGS. 1, 2A, 2B, and 3 together, HTTP request page 300A is downloaded to host computer system 102 from application server 152. User input recording is activated in ACTIVATE USER INPUT RECORDING OPERATION 208 as set forth above.

HTTP request page 300A is an interface for transferring money from one account to another account. HTTP request page 300A includes a transferor account number field 302, a transferee account number field 306, an amount field 310, and a submit button 314.

For purposes of illustration, a user using keyboard 116 and mouse 118 inputs information into HTTP request page 300A to transfer money from one account to another account, i.e., to perform a legitimate financial transaction.

To illustrate, a user uses a pulldown menu 316 to select a transferor account value 304, i.e., "555-555xxx", in transferor account number field 302. In the transferee account number field 306, the user types a "4" and the Web browser inserts the form value "444-444xxx" as a transferee account value 308. In the amount field 310, the user types the amount "500.00" as an amount value 312. The information input using keyboard 116 is recorded by keyboard logger 142.

The user then activates submit button 314, e.g., by clicking on submit button 314, which initiates a transaction request. Transferor account value 304, transferee account value 308, and amount value 312, i.e., "555-555xxx", "444-444xxx", "500.00", are obtained from HTTP request page 300A and packaged into a transaction request.

At TRANSACTION REQUEST CHECK OPERATION 210, a determination is made that the transaction request has been made and the transaction request is stalled in STALL REQUEST OPERATION 218. Transferee account value 308 and amount value 312 are parsed as critical values from the transaction request in PARSE CRITICAL VALUES FROM REQUEST OPERATION 220. Transferee account value 308 is selected as the first critical value to be evaluated in SELECT FIRST CRITICAL VALUE OPERATION 222. A determination is made in CRITICAL VALUE MATCHES USER INPUT CHECK OPERATION 224 that transferee account value 308 does not match the user input, and flow moves to CRITICAL VALUE MATCHES VALUE IN TRANSACTION HISTORY STORE CHECK OPERATION 234. Recall that transferee account value 308 was programmatically entered by the Web browser as a cached form value that was entered by the user in a previous transaction request and thus is a value in transaction history store 144.

In CRITICAL VALUE MATCHES VALUE IN TRANSACTION HISTORY STORE OPERATION 234, a determination is made that transferee account value 308 does match a value in transaction history store 144 and flow moves to ADDITIONAL CRITICAL VALUES CHECK OPERATION 228.

In ADDITIONAL CRITICAL VALUES CHECK OPERATION 228, a determination is made that there is at least one additional critical value that has not been evaluated in the transaction request, i.e., amount value 312. Accordingly, amount value 312 is selected as the next critical value to be evaluated in SELECT NEXT CRITICAL VALUE OPERATION 232.

Recall that amount value 312 was input by the user using keyboard 116. Accordingly, a determination is made that amount value 312 matches the user input in CRITICAL VALUE MATCHES USER INPUT CHECK OPERATION 224. Transaction history store 144 is updated with amount value 312 in UPDATE TRANSACTION HISTORY STORE OPERATION 226.

A determination is made that there are no additional critical values to be evaluated in ADDITIONAL CRITICAL VALUES CHECK OPERATION 228, and the transaction request, which is legitimate, is allowed in ALLOW REQUEST OPERATION 230.

Figure 4:
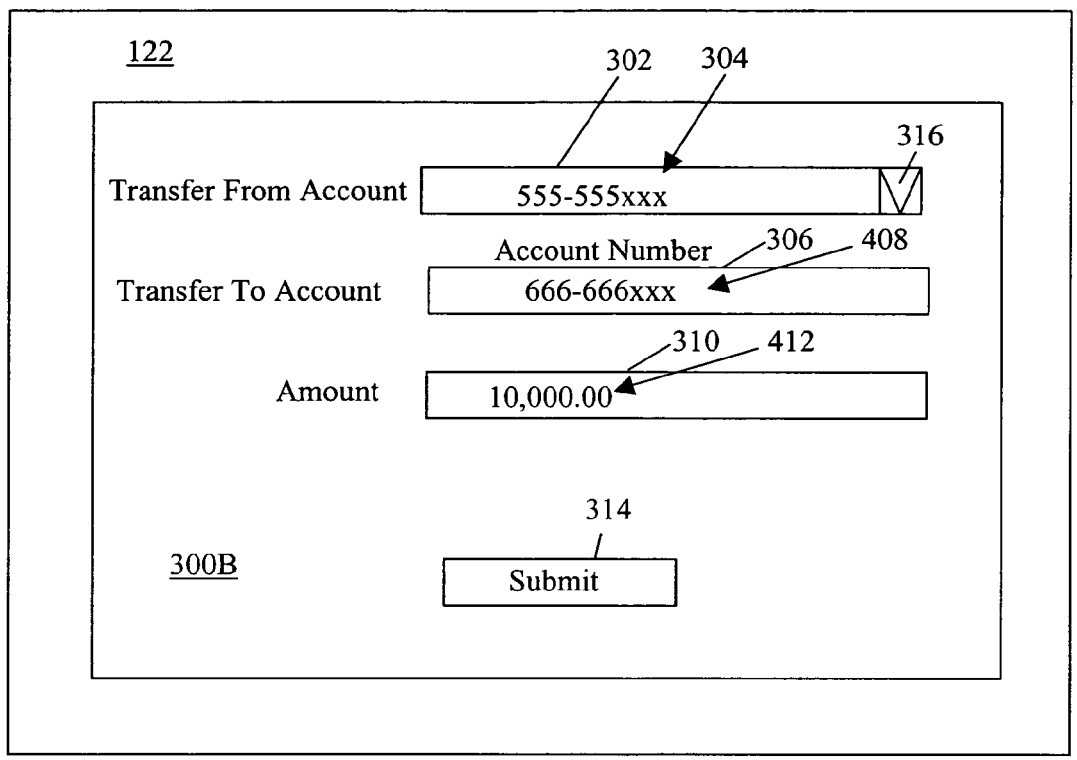

FIG. 4 is a protected financial institution's HTTP request page 300B as displayed on display device 122 of host computer system 102 (FIG. 1) in accordance with another embodiment of the present invention. Referring now to FIGS. 1, 2A, 2B, and 4 together, HTTP request page 300B is similar to HTTP request page 300A of FIG. 3 except that malicious information has been programmatically entered into HTTP request page 300B to maliciously transfer money from one account to another account, i.e., to perform a malicious financial transaction. Although the malicious transaction request is discussed in reference to FIG. 4 for purposes of illustration, it is to be understood that the malicious transaction request can be programmatically constructed without being displayed on display device 122 to conceal the malicious transaction from the user.

In accordance with this malicious transaction, a malicious transferee account value 408, i.e., "666-666xxx" is programmatically entered into transferee account number field 306. Further, a malicious amount value 412, i.e., "10,000.00" is programmatically entered into amount field 310. Submit button 314 is activated, which initiates the malicious transaction request. Transferor account value 304, malicious transferee account value 408, and malicious amount value 412, i.e., "555-555xxx", "666-666xxx", "10,000.00", are obtained from HTTP request page 300B and packaged into a malicious transaction request.

At TRANSACTION REQUEST CHECK OPERATION 210, a determination is made that the transaction request has been made and the transaction request is stalled in STALL REQUEST OPERATION 218. Transferee account value 408 and amount value 412 are parsed as critical values from the transaction request in PARSE CRITICAL VALUES FROM REQUEST OPERATION 220. Transferee account value 408 is selected as the first critical value to be evaluated in SELECT FIRST CRITICAL VALUE OPERATION 222. A determination is made in CRITICAL VALUE MATCHES USER INPUT CHECK OPERATION 224 that transferee account value 308 does not match the user input, as account value 308 was not input by the user, and flow moves to CRITICAL VALUE MATCHES VALUE IN TRANSACTION HISTORY STORE CHECK OPERATION 234.

In CRITICAL VALUE MATCHES VALUE IN TRANSACTION HISTORY STORE OPERATION 234, a determination is made that transferee account value 408 does not match a value in the transaction history store, as transferee account value 408 was not programmatically entered as a cached form value by the Web browser, and so flow moves to CRITICAL VALUE MATCHES VALUE IN HTTP REQUEST PAGE CHECK OPERATION 236. In CRITICAL VALUE MATCHES VALUE IN HTTP REQUEST PAGE CHECK OPERATION 236, a determination is made that transferee account value 408 does not match a value in the HTTP request page, as transferee account value 408 was not entered as a cached or dynamic value in the HTTP request page. Accordingly, the user is asked to approve the malicious transaction request in SEEK APPROVAL OF SUSPICIOUS REQUEST OPERATION 238.

Realizing that the user did not make the transaction request, the user denies the transaction request and flow moves from REQUEST APPROVED CHECK OPERATION 240 to TAKE PROTECTIVE ACTION OPERATION 242. In TAKE PROTECTIVE ACTION OPERATION 242, protective action is taken. At a minimum, the malicious transaction request is terminated.

In the above manner, malicious transactions within an otherwise legitimate transaction session are detected and defeated. Further, legitimate transactions are evaluated and allowed without user input, and the associated user inconvenience and annoyance. More particularly, all malicious transactions are blocked, while the user is rarely interrupted to authenticate a legitimate transaction.

Referring again to FIG. 1, although piggybacking malicious code blocking application 106 is set forth is being in host computer system 102, in another embodiment, piggybacking malicious code blocking application 106 is in proxy appliance 150 instead. In accordance with this embodiment, proxy appliance 150 is located between and intercepts HTTP traffic between host computer system 102 and network 124 and a secure connection exists between host computer system 102 and proxy appliance 150.

In another embodiment, client-server system 100 does not include proxy appliance 150 and piggybacking malicious code blocking application 106 is on host computer system 102. In accordance with this embodiment, host computer system 102 is directly connected to network 124.

Further, although piggybacking malicious code blocking application 106 is referred to as an application, this is illustrative only. Piggybacking malicious code blocking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible medium configured to store computer readable code including CD-ROM discs, DVDs, ROM cards, floppy discs, magnetic tapes, computer hard drives and servers on a network.

As illustrated in FIG. 1, this medium belongs to the computer system itself. However, the medium is also removed from the computer system. For example, piggybacking malicious code blocking application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that execute piggybacking malicious code blocking application 106 in accordance with at least one of the embodiments as described herein. Similarly, in another embodiment, host computer system 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, piggybacking malicious code blocking application 106 in accordance with one embodiment of the present invention can be implemented in a wide variety of computer system configurations. In addition, piggybacking malicious code blocking application 106 could be stored as different modules in memories of different devices. For example, piggybacking malicious code blocking application 106 could initially be stored in server system 130, and as necessary, a portion of piggybacking malicious code blocking application 106 could be transferred to host computer system 102 and executed on host computer system 102. Consequently, part of the piggybacking malicious code blocking functionality would be executed on processor 134 of server system 130, and another part would be executed on processor 108 of host computer system 102. In view of this disclosure, those of skill in the art can implement various embodiments of the present invention in a wide variety of physical hardware configurations using an operating system and computer programming language of interest to the user.

In yet another embodiment, piggybacking malicious code blocking application 106 is stored in memory 136 of server system 130. Piggybacking malicious code blocking application 106 is transferred over network 124 to memory 114 in host computer system 102. In this embodiment, network interface 138 and I/O interface 110 would include analog modems, digital modems, or a network interface card. If modems are used, network 124 includes a communications network, and piggybacking malicious code blocking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer system comprising:
   a memory having stored therein a piggybacking malicious code blocking application; and
   a processor coupled to said memory, wherein execution of said piggybacking malicious code blocking application generates a method comprising:
   determining whether a transaction request has occurred during a transaction session, wherein upon a determination that said transaction request has occurred, said method further comprising:
   following a determination that a transaction request has been made, the transaction request is intercepted by an http proxy which stalls the transaction request until a determination is made that the transaction request is legitimate, the process for determining whether the transaction request is legitimate comprising:
   parsing a first critical value from said transaction request; and
   determining whether said first critical value is legitimate;
   upon a determination that said first critical value is legitimate, said piggybacking malicious code blocking application further performs:
   determining whether said transaction request contains at least one additional critical value to be evaluated as legitimate;
   selecting a second critical value upon a determination that said transaction request does contain said at least one additional critical value; and
   determining whether said second critical value is legitimate.

2. A computer-program product comprising a nontransitory computer readable medium containing computer program code stored thereon which when executed by a processor, performs operations comprising:
   a piggybacking malicious code blocking application for determining whether a transaction request has occurred during a transaction session, wherein upon a determination that said transaction request has occurred, said piggybacking malicious code blocking application further for:
   following a determination that a transaction request has been made, the transaction request is intercepted by an http proxy which stalls the transaction request until a determination is made that the transaction request is legitimate, the process for determining whether the transaction request is legitimate comprising:
   parsing a first critical value from said transaction request; and determining whether said first critical value is legitimate;

upon a determination that said first critical value is legitimate, said piggybacking malicious code blocking application further performs:

determining whether said transaction request contains at least one additional critical value to be evaluated as legitimate;

selecting a second critical value upon a determination that said transaction request does contain said at least one additional critical value; and determining whether said second critical value is legitimate.

3. The computer-program product of claim 2 wherein said piggybacking malicious code blocking application is further for recording user input, said determining whether said first critical value is legitimate comprising determining whether said first critical value matches said user input, wherein upon a match between said first critical value and said user input, a determination is made that said first critical value is legitimate.

4. The computer-program product of claim 3 wherein said piggybacking malicious code blocking application is further for updating a transaction history store with said first critical value upon said determination that said first critical value is legitimate.

5. The computer-program product of claim 2 wherein said determining whether said first critical value is legitimate comprising determining whether said first critical value matches a value in a transaction history store, wherein upon a match between said first critical value and a value in said transaction history store, a determination is made that said first critical value is legitimate.

6. The computer-program product of claim 5 wherein said transaction history store comprises critical values from previous transaction requests.

7. The computer-program product of claim 3 wherein said critical values from previous transaction requests were entered using a keyboard.

8. The computer-program product of claim 2 wherein said determining whether said first critical value is legitimate comprising determining whether said first critical value matches a value in a HTTP request page, wherein upon a match between said first critical value and a value in said HTTP request page, a determination is made that said first critical value is legitimate.

9. The computer-program product of claim 8 wherein said piggybacking malicious code blocking application is further for updating a transaction history store with said first critical value upon said determination that said first critical value is legitimate.

10. The computer-program product of claim 2 wherein upon a determination that said first critical value is not legitimate, said piggybacking malicious code blocking application further for seeking approval of said transaction request.

11. The computer-program product of claim 10 wherein upon approval of said transaction request, said piggybacking malicious code blocking application is further for:

updating a transaction history store with said first critical value; and allowing said transaction request.

12. The computer-program product of claim 10 wherein upon denial of said transaction request, said piggybacking malicious code blocking application is further for taking protective action comprising terminating said transaction request.

13. The computer-program product of claim 2 wherein said piggybacking malicious code blocking application is further for:

stalling said transaction request; and allowing said transaction request upon a determination that said first critical value is legitimate.

14. The computer-program product of claim 2 wherein said piggybacking malicious code blocking application comprises:

a HTTP proxy;

a keyboard logger; and a transaction history store.

15. The computer-program product of claim 2 wherein said piggybacking malicious code blocking application is further for determining whether a URL has been requested, wherein upon a determination that a URL has been requested, said piggybacking malicious code blocking application is further for determining whether said URL is protected.

16. The computer-program product of claim 15 wherein upon a determination that said URL is protected, said piggybacking malicious code blocking application is further for activating user input recording.

17. The computer-program product of claim 16 wherein said determination that said URL is protected indicates that said transaction session is being initiated, said piggybacking malicious code blocking application further for determining whether said transaction session has ended, wherein upon a determination that said transaction session has ended, said piggybacking malicious code blocking application further for deactivating said user input recording.

18. The computer-program product of claim 2 wherein upon a determination that the either of the first or second critical values of the transaction request was not input by the user directly into the transaction request, determining if the transaction request is deemed suspicious, and seeking approval of suspicious request, by asking the user to authenticate the transaction request, if the transaction request has been approved by the user, the suspicious transaction request is deemed legitimate.

\* \* \* \* \*

UNITED STATES PATENT AND TRADEMARK OFFICE
CERTIFICATE OF CORRECTION

| | | |
|---|---|---|
| PATENT NO. | : 8,196,200 B1 | Page 1 of 1 |
| APPLICATION NO. | : 11/540821 | |
| DATED | : June 5, 2012 | |
| INVENTOR(S) | : Matthew Yeo and Carey Nachenberg | |

It is certified that error appears in the above-identified patent and that said Letters Patent is hereby corrected as shown below:

In Column 15, Line 36, Claim 7, replace "claim 3" with --claim 6--.

Signed and Sealed this
Eleventh Day of September, 2012

David J. Kappos
*Director of the United States Patent and Trademark Office*